United States Patent [19]

Shaw

[11] 4,038,826
[45] Aug. 2, 1977

[54] SOLAR ENERGY SYSTEM UTILIZING BUOYANCY AS A CONVERSION FORCE

[76] Inventor: John S. Shaw, 1812 E. Marlette, Phoenix, Ariz. 85016

[21] Appl. No.: 554,463

[22] Filed: Mar. 3, 1975

[51] Int. Cl.² .............................................. F03G 7/06
[52] U.S. Cl. ...................................... 60/641; 60/496; 417/5
[58] Field of Search ................ 60/495, 496, 641, 659; 415/5, 7

[56] References Cited

U.S. PATENT DOCUMENTS

| 272,656 | 2/1883 | Cook | 60/496 |
|---|---|---|---|
| 366,551 | 7/1887 | Baker | 60/496 |
| 2,933,885 | 4/1960 | Benedek et al. | 60/659 |
| 2,969,637 | 1/1961 | Rowerkamp | 60/659 X |
| 3,364,676 | 1/1968 | Miller | 60/641 |
| 3,576,424 | 4/1971 | Strapp | 60/659 |

FOREIGN PATENT DOCUMENTS

| 4,058 | 8/1816 | United Kingdom | 60/496 |
|---|---|---|---|
| 163,791 | 5/1921 | United Kingdom | 60/496 |
| 215,602 | 5/1924 | United Kingdom | 60/496 |

*Primary Examiner*—Allen M. Ostrager
*Attorney, Agent, or Firm*—Warren F. B. Lindsley

[57] ABSTRACT

A closed cycle energy conversion system adaptable for use with, inter alia, solar collectors and other sources of available heat for increasing the temperature of a circulating fluid to a super heated condition and employing a substantially vertically positioned gas expander column comprising an endless arrangement of cups journaled for movement in a closed path within a liquid medium in the column for trapping the super heated fluid when flashed into a gas inside a succession of the cups inverted at the bottom of the column and displacing at least a part of the liquid in the cups, thereby providing a buoyancy force on the cups causing them to rise in the column exerting a rotating force on the endless arrangement of cups. The trapped gas is released at the top of the liquid in the column to be condensed, pressurized and recirculated to solar collectors and/or other sources of heat for reuse in the system.

6 Claims, 6 Drawing Figures

SOLAR ENERGY SYSTEM UTILIZING BUOYANCY AS A CONVERSION FORCE

BACKGROUND OF THE INVENTION

In recent years, the rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the developmemt of fossil fuel resources has continued at a rapid rate, but it becomes increasingly evident for a number of reasons that these efforts are inadequate to keep pace with the demands of the growing population.

A first difficulty is the limited availability of fuels such as oil and natural gas. Most countries in the world today do not have adequate sources of these fuels within their own boundaries and are dependent upon foreign sources, notably the middle East countries for supply. Such a dependence can and does have undesirable effects on the economies of the countries involved and political complications often result. There are also limited sites available that are appropriate for hydroelectric installations.

In the United States, there are a number of fossil fuels available, such as high-sulphur coal and oil shale, but the development and use of those resources has been complicated by economic and environmental concerns which rule against the use of these resources for a number of reasons including the destructive effects of strip mining, atmospheric contamination due to the high sulphur content of the coal, the cost of extracting the oil from the shale, etc.

Most recently, the hope that nuclear power would soon lead to a rapid solution of the energy dilemma has been cooled by delays stemming again from environmental conerns and reservations about the safety of such plants and about the adequacy of plans for handling the radioactive wastes associated with such installations.

In the face of these growing demands and limited resources, there is one source of energy which is readily available to every country in the world in virtually unlimited quantities. This virtually untapped source is solar energy. The World Book Encyclopedia (copyright 1968, USA) states that the amount of solar energy reaching the earth in one day equals the energy that could be produced by burning 550,000,000,000, tons of coal — as much coal as would be dug in the United States in 1000 years at the 1968 rate of mining. It further states that enough solar energy reaches the United States in 20 minutes to fill the country's entire power needs for 1 year.

The interest in this almost boundless resource and in its development and harnessing for use in homes and factories is rising as other resources dwindle. Its desirability is further enhanced by the fact that solar energy may be converted to practicable use without the hazard of environmental contamination.

In climates where there is an abundance of sunshine throughout the year, there is a growing interest in the harnessing of solar energy. Home owners and industrial operations are recognizing the potential value of having their own independent power sources which are not subject to interruption, other than natural phenomena, curtailment or increased costs as the result of national or international events.

PRIOR ART

Until recently, the development of energy collectors and converters has been associated for the most part with solar programs involving military and space applications while only limited attention has been given to broad consumer use. As a result, there is a great potential for improvements in existing collection devices that will result in reduced manufacturing costs and improved thermal efficiencies.

One solar device for collecting thermal energy known as a flat plate collector is described by the World Book Encyclopedia (copyright 1968). It is made of metal and glass with one or more layers of glass laid over a blackened metal plate. Air spaces are provided between the layers of glass. Air or water passes through tubes under the metal plate to remove the collected thermal energy. The layers of glass in cooperation with the blackened metal plate act as a heat trap, letting in the sun's rays but keeping most of the heat from escaping again.

Other solar energy collectors have utilized parabolic reflectors which track the sun and focus the collected rays on an output or converter stage which delivers thermal, mechanical or electric energy.

Conversion from thermal to mechanical and electric energy has received a great deal of attention over the years and the technologies in these areas are well developed with the exception that the special requirements for relatively low power installations have generally been neglected. As a result, there are several proposed capital intensive systems available for conversion using conventional boiler, turbine, condensor systems at very high power levels, but these systems are impractical in terms of initial and operating costs at low power, low temperature differential levels.

For the relatively low power applications toward which this invention is directed, a more simplified and inexpensive conversion means is needed.

SUMMARY OF THE INVENTION

In accordance with the invention claimed, an improved energy conversion system is provided which is particularly suited for applications at the relatively low power levels which are of interest to home owners, small business and industrial operations.

It is, therefore, one object of this invention to provide an improved low cost energy conversion system.

Another object of this invention is to provide an improved low cost solar energy collector and conversion system.

A further object of this invention is to provide such a system which is particularly well suited for application at the lower power levels where conventional thermal to mechanical and electrical conversion systems are not economically attractive.

A still further object of this invention is to provide such an improved system through the use of a novel conversion means utilizing the buoyancy of a gas in a liquid column as the motive force.

A still further object of this invention is to provide in such a system a capability for collecting at all times during the day a maximum amount of radiated energy from the sun, this being achieved through the incorporation of a tracking mechanism which causes the collectors to be optimally directed at all times.

A still further object of this invention is to provide such a system in a compact unitized structure which may be conveniently installed in a wide choice of locations.

A still further object of this invention is to provide in such a system an adjunct with a capability for storage of thermal energy during periods of peak availability, the stored energy being available for utilization during periods of darkness or high demand.

A still further object of this invention is to provide in such a system a capability for the confinement of the gas and the liquid medium in a closed system which virtually eliminates the need for replenishment of either the gas or the liquid throughout the course of system operation.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
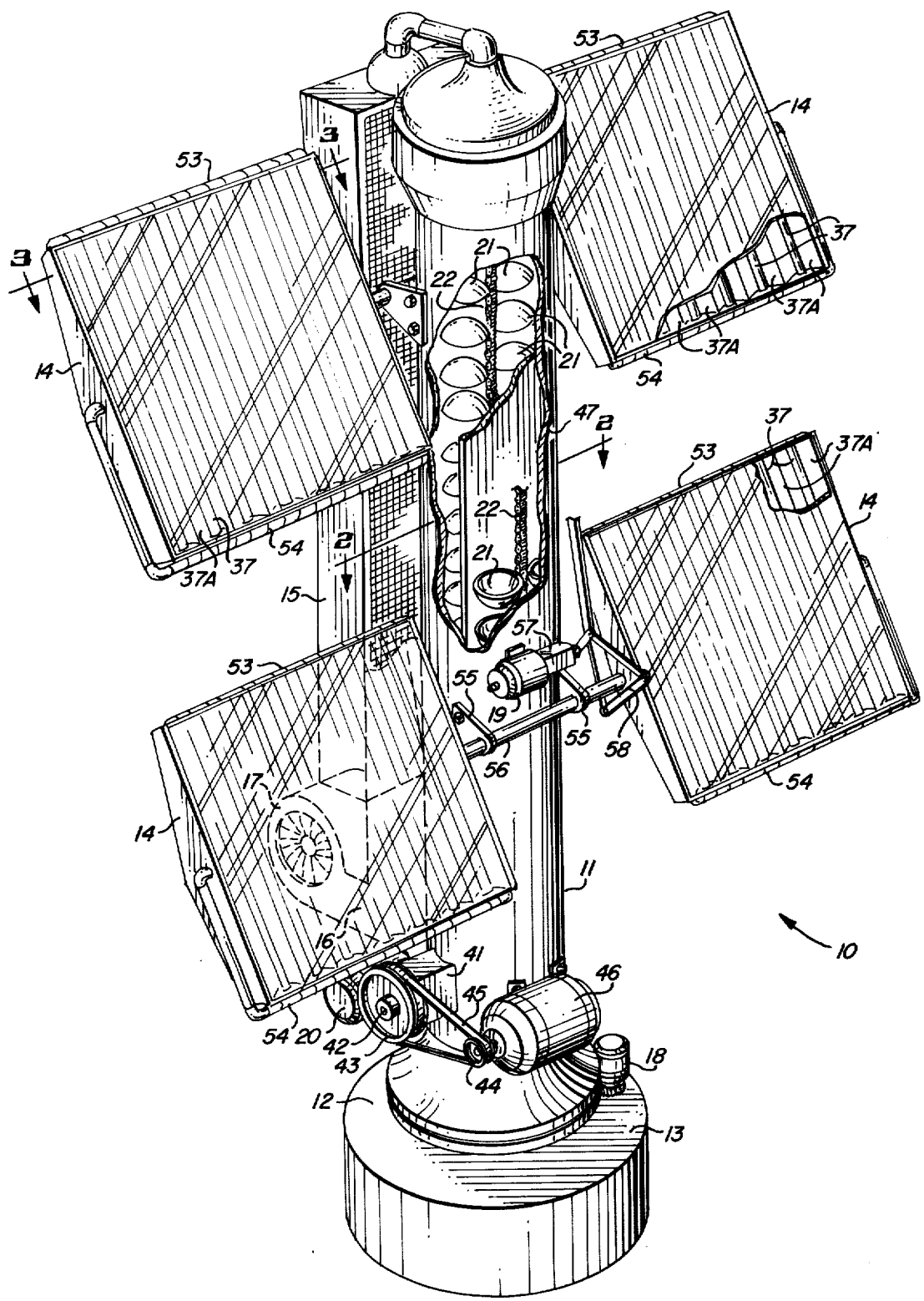
FIG. 1 is a perspective view of a first embodiment of a solar energy collector and conversion system.
Figure 4:
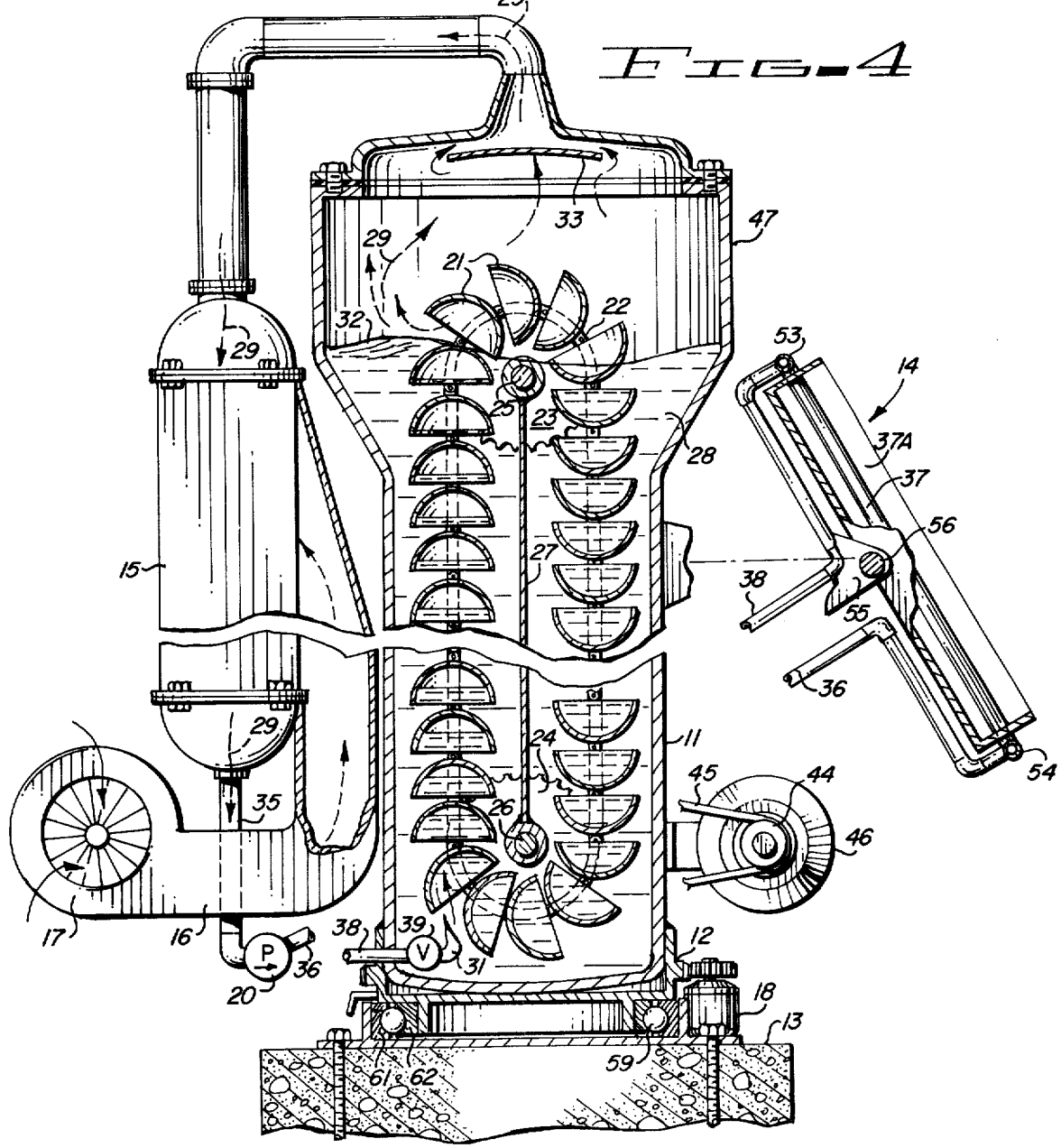
FIG. 4 is a partial cross-sectional side view of the collector and converter of FIG. 1 with only one of the four collectors of FIG. 1 shown.

Referring more particularly to the drawing by characters of reference, FIGS. 1-4 disclose an improved closed cycle solar energy collection and conversion system 10 comprising a vertically positioned cylindrical insulated tank or column 11 resting on a rotatable support 12 which is mounted on a concrete footing 13. One or more tilting collector panels or collectors 14 are pivotally secured to the sides of column 11. An air or water cooled condensor 15 may be used and is shown in FIGS. 1 and 4 with an attached air plenum 16 and cooling fan 17 secured to one side of column 11, preferably the shady side. A rotational drive motor 18 is provided for rotating column 11 on support 12 with a tilting drive motor 19 shown for tilting the collectors 14. A recirculating pump 20 is provided to force the condensed liquid through collectors 14 for heating under pressure before expansive release through throttle valve 39 and through jet nozzles 31 in column 11 as shown in FIGS. 1 and 4. A plurality of cups 21 are secured to both sides of an endless drive chain 22. Chain 22 is carried on first and second coplanar sprocket wheels 23 and 24 having parallel axis 25 and 26, respectively. The first wheel 23 is mounted near the top of column 11 and the second wheel 24 is mounted near the bottom of column 11 so that when wheels 23 and 24 rotate in a clockwise direction, as viewed in FIG. 4, the plurality of cups 21 which are equally spaced along both sides of the full length of chain 22 are moved upward in an inverted position on the rising or left half portion of the chain 22, are then tilted upright as they pass over the top of wheel 23, and move downward in an upright position as they are carried to the bottom of tank 11 where they again rotate to an inverted position as they pass around wheel 24. It should be noted that the cups may be spaced closer together or farther apart along chain 22 and may be randomly spaced or spaced in separated groups, if so desired. A vertical plate 27 separates the right half of column 11 from the left half of column 11. A liquid 28 is provided in column 11 in which the wheels 23 (except for the top portion thereof), chain 22 and cups 21 are submerged, which liquid may be water or any other liquid such as, for example, oil, diphenyl, etc., which will not mix with the gas used in the fluid gas system of the heating and condensing cycle. Cups 21 when moved under the bottom of wheel 24 are rotated from an upright to an inverted position to receive a gas 29 hereinafter explained utilized to produce a buoyancy effect on cups 21.

Figure 2:
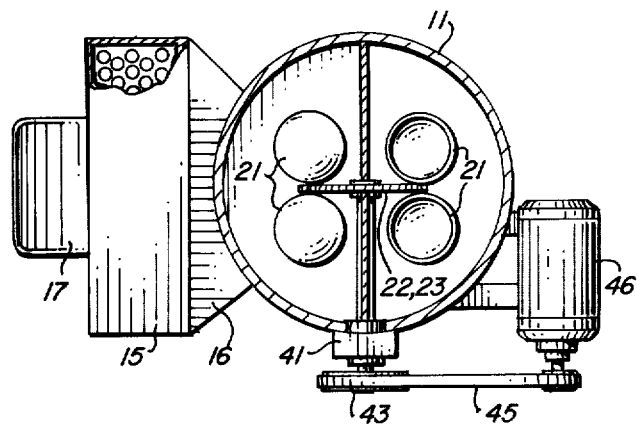
FIG. 2 is a partial cross-sectional top view of the equipment of FIG. 1 with the collector portion omitted.
Figure 3:
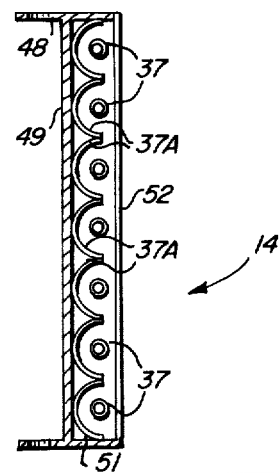
FIG. 3 is a cross-sectional view of one of the collector assemblies of FIG. 1.

As shown in FIGS. 1 and 2, the endless drive chain 22 comprises pairs of cups 21 juxtapositioned along the chain and opening in the same direction to provide a joint buoyancy effect on the chain when charged with a gas.

Figure 5:
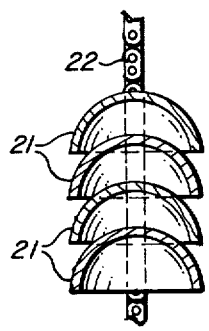
FIG. 5 is an elevation of portion of the chain, cup assembly showing a modification embodying an overlapping arrangement of the cups.

The modification of FIG. 5 shows a further arrangement of the cups wherein they are proportioned so that the following cups extend part way into the leading cups. This arrangement reduces the turbulence associated with the movement of the chain of cups through the liquid and essentially forms a column of gas moving through the liquid.

Fluid 28, which for purposes of discussion is considered as water, but may be any liquid that is immiscible with the gasifying liquid used, such as SAE No. 10 oil, fused salts, such as magnesium flouride, etc., is confined to the interior of column 11 where it serves as a medium for the buoyancy effect produced on the inverted cups 21 by the circulating gas 29. Gas 29 is injected into column 11 from a pair of nozzles 31 located just below a juxtapositioned pair of cups 21 at a point near the lower left of wheel 24 where the cups 21 are achieving their inverted position during their travel along the endless path.

Beginning at the point of discharge from nozzle 31, a quantity of gas 29 is discharged into each passing pair of cups 21 as they assume their inverted position, the gas producing a buoyant upward force on cups 21 and driving them upwardly until they reach the top surface 32 of fluid 28. Then, as the cups rotate to an upright position, the gas is spilled into the open space above the surface 32 of fluid 28 where it flows around a baffle plate 33 and upward through a pipe 34 which carries it down into condenser 15. Condenser 15 is similar to a truck radiator where the gas flows through finned tubes around which cool air is blown to remove excess heat that was not converted to mechanical energy as it drove the cups upward inside column 11.

In one embodiment of the closed cycle system of the invention, gas 29 may be, but is not limited to, hexane ($C_6H_{14}$) formed from its liquid hydrocarbon state which is readily converted into a liquid by the cooling action of condenser 15. It should be noted that there are many workable combinations of liquids and gases that are immiscible and may be used in the disclosed apparatus, particularly the hydrocarbon liquids. The liquid state of gas 29 leaves the bottom of condenser 15 and is drawn in to pump 20 via a connecting pipe 35. From pump 20, the liquid state of gas 29 is discharged under pressure into a tube 36 which carries it to the collectors 14 where it flows through collector tubes 37 picking up thermal energy radiated by the sun. The liquid is then released through a throttling valve 39 wherein the liquid is transformed into a gaseous state causing it to flow at a greatly increased rate through an exhaust tube 40 which leads directly to nozzles 31. In the closed gas-to-liquid conversion process disclosed, re-conversion from liquid to gas is accomplished either in the throttling valve 39 within or immediately upon discharge from the nozzles 31, the point of re-conversion being determined by the temperature of the super heated liquified gas. Ideally, liquid 28 inside column 11 is held at a temperature somewhat lower than that of gas 29 as it is ejected from nozzles 31. The slight drop in pressure in throttling valve 39 and the elevated temperature of the liquid state of gas 29 in tube 40 at the point of injection from nozzles 31 causes the ejected liquid to flash into a gaseous state, at least partially filling cups 21. The quantum loads of gas 29 inside cups 21 then expands as it is subjected to the lessening hydrostatic pressure as it rises within cups 21 in column 11 and may absorb additional thermal energy from the surrounding fluid 28, and the walls of the cups 21. As the captured gas within cups 21 drives them upwardly, the thermal and kinetic energy of the gas manifested as buoyancy is converted to mechanical energy. Expansion of gas 29 within the inverted cups 21 as heat is gained from the surrounding medium produces an added increment of buoyancy accounting for additional conversion of thermal to mechanical energy.

The buoyancy force thus applied to the inverted cups 21 is converted into torque acting on axis 26 of wheel 24. The axis 26 is coupled directly to a gear box 41 which may be mounted on the outside wall of column 11. The gear box accomplishes a step-up in rotational velocity at its output shaft 42 on which is mounted a drive pulley 43 which in turn is coupled to a second pulley 44 by means of a drive belt 45. The second pulley 44 is mounted on the shaft of an electric generator 46 which converts the mechanical energy to electrical energy for transmission to the point of use.

Column 11 has an outer insulating barrier 47 which prevents excessive heat loss through its wall and facilities the maintenance of the elevated temperature of liquid 28.

Each of the collectors 14 have a plurality of parallel collector tubes 37 which run in a generally vertical direction, each lying along the focal line of a linear parabolic reflector channel 37A, the surface of the channel being coated with a reflective material. The reflector channels 37A are supported and insulated inside a collector frame 48 having a flat back-up plate 49 and surrounding perpendicular walls 51. The collector tubes 37 are oxidized or coated with a black material for maximum thermal absorption. Covering the front of the collectors 14 is an insulating glass face 52 which comprises two parallel sheets of glass separated by a depleted air space, the insulating glass sandwich commonly known in the building trade as Thermopane. The glass face 52 readily passes the incident thermal energy radiated from the sun but prevents heat loss from the tubes 37 by convection. The upper ends of the tubes 37 are interconnected by an upper junction tube 53 and the lower ends of the tubes 37 are interconnected by a lower junction tube 54. Tube 36 from pump 20 connects through an articulated joint to lower junction tube 54 delivering condensed pressurized liquid to collector 14 which flows upward acquiring heat energy through the plurality of parallel collector tubes 37 into upper junction tube 53 through a return articulated joint and thence into tube 38 which connects throttling valve 39 and expansion tube 40 to jets 31 for discharge into cups 21. Where more than one of the collectors 14 are employed, as indicated in FIG. 1, the upper junction tubes 53 are all connected together and the lower junction tubes 54 are all connected together so that all of the collectors 14 are effectively connected in parallel for parallel fluid flow.

The collector panels 14 are supported by means of brackets 55 and pivot bars 56. As shown more clearly in FIG. 1, one bar 56 and two brackets 55 are utilized to support two collector panels 14, the bar 56 constituting a round horizontal bar which is fixedly attached to the two adjacent collectors 14 and passes through aligned holes in the two brackets 55, the brackets 55 being attached side-by-side to the outside wall of column 11. The tilt drive motor 19 which is also secured to the wall of column 11 has its shaft coupled through a gear box 57 and a lever type linkage 58 to one of the collectors 14 and is controlled to direct the gang coupled collectors 14 toward the sun.

It will be recognized that the tilting of the collectors 14 can accomplish only the appropriate elevation adjustments. The collectors must also be turned to the proper azimuth orientation. This is accomplished by means of the rotatable support 12 and the rotational drive motor 18. Rotatable support 12 incorporates a set of heavy duty ball bearings 59 confined with mating concentric raceways 61 and 62, raceway 61 being fixedly attached to footing 13 and raceway 62 being fixedly attached to the base of column 11. Column 11 is thus free to rotate relative to footing 13 as it is supported by the rolling bearings 59.

The condenser 15 is cooled by air supplied by the cooling fan 17 through the plenum 16 and/or by a liquid heat exchanger.

The relatively simple closed cycle solar collector and converter system of FIGS. 1–4 is thus seen to provide the desired functions of absorbing radiated thermal energy from the sun, converting it first to mechanical energy and then to electrical energy for transmission to the point of use. The system is compact and inexpensive and does not require carefully machined parts or parts subjected to excessively high temperatures or to high fluid velocities. Low initial cost, low maintenance and long equipment life are thus to be expected.

It should be recognized that in place of collectors 14 being heated by solar energy, the liquid state of gas 29 may be heated by waste steam or other heat forms from any industrial process. Thus, the discharge of heat into the atmosphere, lakes, streams or oceans may be utilized to heat the liquified gas, for example, in addition to or in place of the sun thereby utilizing a valuable, now wasted, form of energy.

Since sunlight is not available 24 hours of the day, it is desirable to provide a means for storing energy during daylight hours for use at other times. The more elaborate system of FIG. 6 incorporates the additional energy storage capability.

Figure 6:
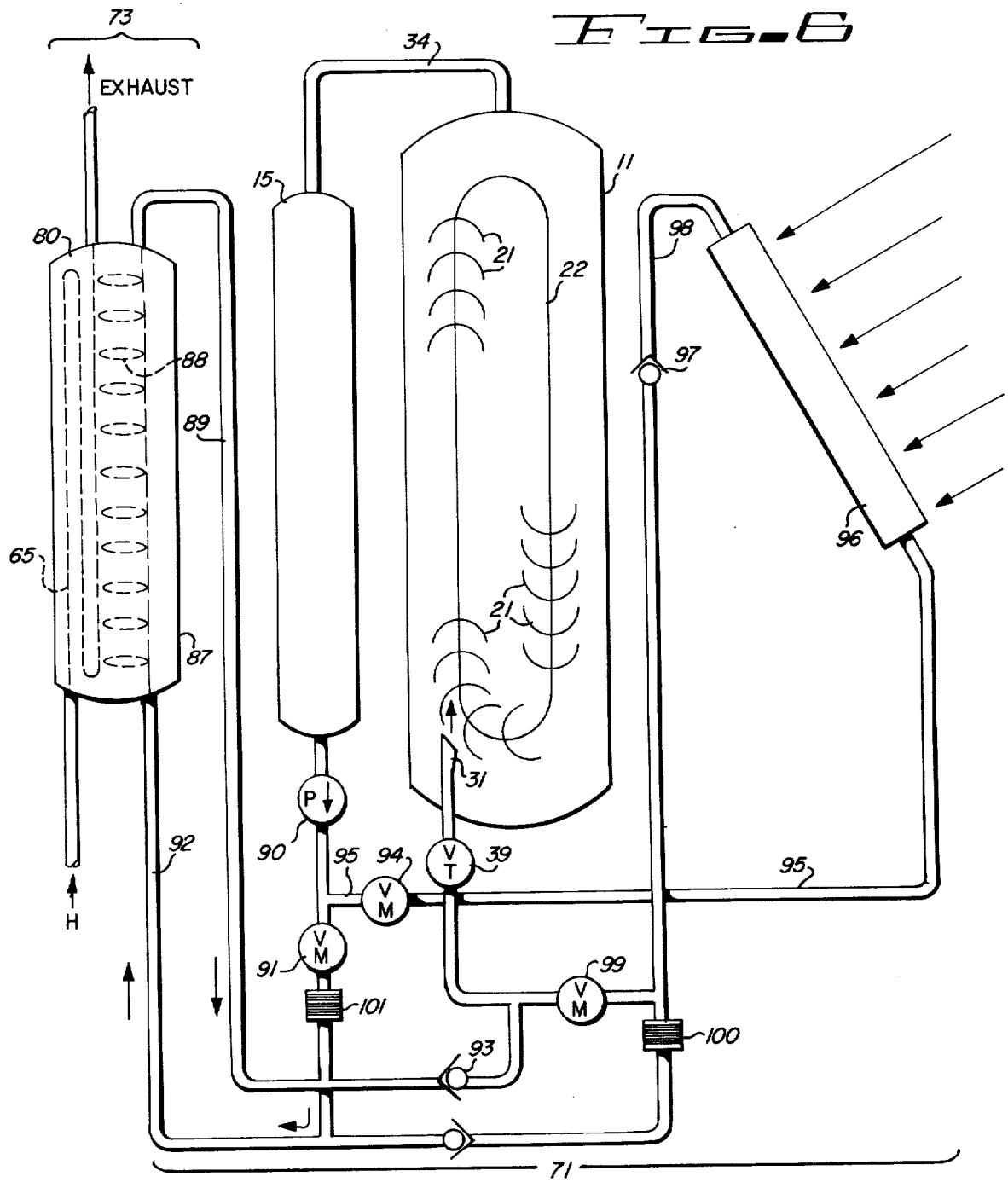
FIG. 6 is a diagrammatic representation of a more elaborate embodiment of the invention which incorporates in addition to the collector and conversion system of FIG. 1, an auxiliary thermal energy storage means.

FIG. 6 discloses a solar energy collection, conversion and storage system comprising: a solar energy collector and converter unit 71, which is essentially identical to the collector and converter 10 of FIGS. 1-4 and a storage unit 73.

The collector and convertor unit 71 delivers electrical and/or other forms of energy to the point of use, utilizing radiated energy from the sun when it is available and from any other source and drawing stored thermal energy from unit 73 when direct solar energy, for example, is not available. The electric generator may be replaced with a mechanical device for direct pumping of refrigerant, water, oil or other media for direct use or storage purposes.

The storage unit 73 comprises an insulated tank 87, a heat transfer coil 88 and a surrounding storate medium 80. Coil 88 is designed to provide maximum heat transfer (low thermal resistance) to or from the storage medium 80. For this purpose, systems of parallel tubes or serpentine paths may be utilized, the preferred design being determined as a compromise between performance and cost. The medium 80 may be heated by excess quantities of the super heated liquid state of gas 29 flowing through coil 88, i.e., during periods when there is an excess of solar energy. Other heat sources may flow through coil 65 to also heat medium 80 to provide stored energy from medium 80 when sufficient solar energy is not available. Thermal energy is extracted from unit 73 by fluid from pump 90 circulating through coil 88. Unit 73 may also be employed, for example, as a water heater or any other heat utilization or storage device.

As indicated earlier, however, the immediate application implied in FIG. 6 involves unit 73 as a supporting storage unit for collector and converter unit 71. In this case, the bottom of coil 88 is connected by a tube 92 and a modulating valve 91 to the output of the pump 90 of unit 71 while the top of coil 88 is connected by a tube 89 and a check valve 93 to the throttling valve 39 and nozzles 31 of unit 71. When combined with unit 71, an additional modulating valve 94 is incorporated in the tube 95 leading from pump 90 to the collector 96 and an additional check valve 97 is incorporated in the tube 98 leading from collector 96 to temperature modulating sensing valve 99 then to throttling valve 39 and nozzles 31. During periods in which solar energy is available, modulating valve 91 and check valve 93 are closed and valve 99 may be partially closed to direct excess heat and fluid from solar collector 96 to storage unit 71.

When solar energy is not available, valves 94 and 97 are closed and the circulating fluid of unit 71 draws thermal energy from unit 73 by passage from pump 90 through open valve 91, tube 92, coil 88, tube 89 and open check valve 93 to throttling valve 39 and nozzles 31. While thermal energy is thus supplied from unit 73, the converter portion of unit 71 otherwise operates in a mode as described earlier for the converter of FIGS. 1-4. In order to provide column and collector rotation swivel joints 100 and 101 may be utilized as illustrated in FIG. 6.

Although but a few embodiments of the present invention have been illustrated and described, it will be apparent to those skilled in the art that various changes and modifications may be made therein without departing from the spirit of the invention or from the scope of the appended claims.

What is claimed is:

1. a unitized mechanism utilizing the buoyancy effect of gas in liquid for generating mechanical shaft energy comprising:

a substantially vertically positioned water containing rotatable column mounted on a base and having a bottom and a top.

an endless conveyor mounted in said rotatable column longitudinally thereof on a pair of spaced sprockets and having a plurality of similarly arranged cups spacedly positioned along said conveyor for rotation around a fixed path, said cups being inverted when moving from the bottom to the top of said rotatable column, means for injecting a pressurized heated gas sequentially into each of said cups at substantially the base of said rotatable column while said cups are achieving their inverted position, said gas comprising a hydrocarbon in its gaseous said heated gas expanding in each of said cups to rotate said conveyor in a given direction from the bottom to the top of the column around its fixed path thereby driving said sprockets and generating useful rotative movement, a condenser connected to the top of said rotatable column for receiving said gas spilled from said cups at the top surface of the water, said condenser cooling and liquifying said gas, means for pressurizing and heating the liquified gas comprising a solar collector having an array of fluid conducting tubes arranged adjacent a reflecting surface, said solar collector being horizontally pivotally mounted on said rotatable column for optimum exposure to solar rays, means for throttling said pressurized heated liquid for controlling it and to transfrom it into a gaseous state for injecting into said cups, pressurizing means for conducting the liquified gas through the tubes of said collector to heat it prior to gasification and injection into each of said cups, and means for rotating said rotatable column and said collector to follow the sun in two planes of motion for optimum focal absorption of solar radiation.

2. The mechanism set forth in claim 1 wherein: said gas comprises hexane.

3. The mechanism set forth in claim 1 wherein:
said liquid comprises a hydrocarbon, and said gas comprises ammonia.

4. The mechanism set forth in claim 1 wherein: said gas comprises one of water or hydrocarbon, and said liquid comprises a fused salt.

5. The mechanism set forth in claim 1, in further combination with:

a liquid storage tank, tubular means associated with said tank for transferring excess heat to the liquid in the tank upon movement of fluid through said tubular means, and means for transmitting the liquified pressurized gas from said condenser to and through said tubular means of said liquid storage tank before or after heating the liquified gas in said solar collector.

6. The mechanism set forth in claim 1 wherein:
said solar collector is replaced with a waste heat source, and said means conducts the liquified gas through said waste heat source.

* * * * *